United States Patent
Anandakrishnan

(10) Patent No.: US 11,438,263 B2
(45) Date of Patent: Sep. 6, 2022

(54) POLICY APPLICATION

(71) Applicant: Cisco Technology, Inc., San Jose, CA (US)

(72) Inventor: Geetha Anandakrishnan, Freemont, CA (US)

(73) Assignee: Cisco Technology, Inc., San Jose, CA (US)

( * ) Notice: Subject to any disclaimer, the term of this patent is extended or adjusted under 35 U.S.C. 154(b) by 170 days.

(21) Appl. No.: 16/684,387

(22) Filed: Nov. 14, 2019

(65) Prior Publication Data

US 2021/0152468 A1 May 20, 2021

(51) Int. Cl.
| | | |
|---|---|---|
| *H04L 45/586* | (2022.01) | |
| *H04L 45/30* | (2022.01) | |
| *H04L 49/00* | (2022.01) | |
| *H04L 41/0893* | (2022.01) | |
| *H04L 43/026* | (2022.01) | |
| *H04L 45/00* | (2022.01) | |
| *H04L 45/302* | (2022.01) | |

(52) U.S. Cl.
CPC ........ *H04L 45/586* (2013.01); *H04L 41/0893* (2013.01); *H04L 43/026* (2013.01); *H04L 45/304* (2013.01); *H04L 45/54* (2013.01); *H04L 49/70* (2013.01)

(58) Field of Classification Search
CPC . H04L 45/586; H04L 41/0893; H04L 43/026; H04L 45/304; H04L 45/54; H04L 49/70
See application file for complete search history.

(56) References Cited

U.S. PATENT DOCUMENTS

| | | | | |
|---|---|---|---|---|
| 2014/0307744 | A1* | 10/2014 | Dunbar | H04L 45/38 370/401 |
| 2015/0207677 | A1* | 7/2015 | Choudhury | H04L 47/12 370/254 |
| 2016/0087905 | A1* | 3/2016 | Liu | H04L 47/20 370/236 |
| 2018/0337849 | A1* | 11/2018 | Sharma | H04L 43/026 |
| 2019/0028345 | A1* | 1/2019 | Kommula | H04L 12/4641 |

* cited by examiner

*Primary Examiner* — Ricky Q Ngo
*Assistant Examiner* — Stephen N Steiner
(74) *Attorney, Agent, or Firm* — Lee & Hayes, P.C.

(57) ABSTRACT

This disclosure describes techniques for applying a policy proximate to a source of data traffic in a network. The techniques include indicating to a destination edge node that a policy relevant to the data traffic has not been applied at a source edge node. The destination edge node may send the policy to the source edge node. The source edge node may apply the policy to a subsequent packet of the data traffic. Application of the policy proximate to the source of the data traffic may conserve network resources and improve performance of the network.

20 Claims, 5 Drawing Sheets

POLICY APPLICATION

TECHNICAL FIELD

The present disclosure relates generally to applying a policy proximate to a source of network traffic, thereby improving performance of the network.

BACKGROUND

Routing of data traffic in a network may be controlled by a policy particular to a source device and a destination device of the data traffic. The policy may be applied at switches of the network, such as at a source node associated with the source device and/or at a destination node associated with the destination device. In some instances, application of the policy can result in a dropped packet of the data traffic. In a case where policy application at the destination node results in a dropped packet, network resources may have been unnecessarily wasted, since bandwidth and/or other network resources were consumed in the data transfer from the source node to the destination node, only to have the packet dropped. Therefore, network performance may be significantly improved where a policy is applied closer to a source than to a destination, potentially avoiding unnecessary consumption of network resources.

Traditionally, a physical top of rack (ToR) switch for a data center may be responsible for directing data traffic. However, in software-defined networking (SDN), virtualized elements may replace many physical hardware components, and policies may be critical for directing data traffic across a fluid virtualized network architecture. Further, the changing network architecture may exacerbate chances for dropped packets. Also, latencies may be greater and/or network resources may be more constrained in a virtualized network. Therefore, virtualized networks may have a critical need for techniques to apply policies closer to sources of data traffic, improving performance of the network.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. In some cases, parentheticals are utilized after a reference number to distinguish like elements. Use of the reference number without the associated parenthetical is generic to the element. The systems depicted in the accompanying figures are not to scale and components within the figures may be depicted not to scale with each other.

DESCRIPTION OF EXAMPLE EMBODIMENTS

Overview

Figure 1:
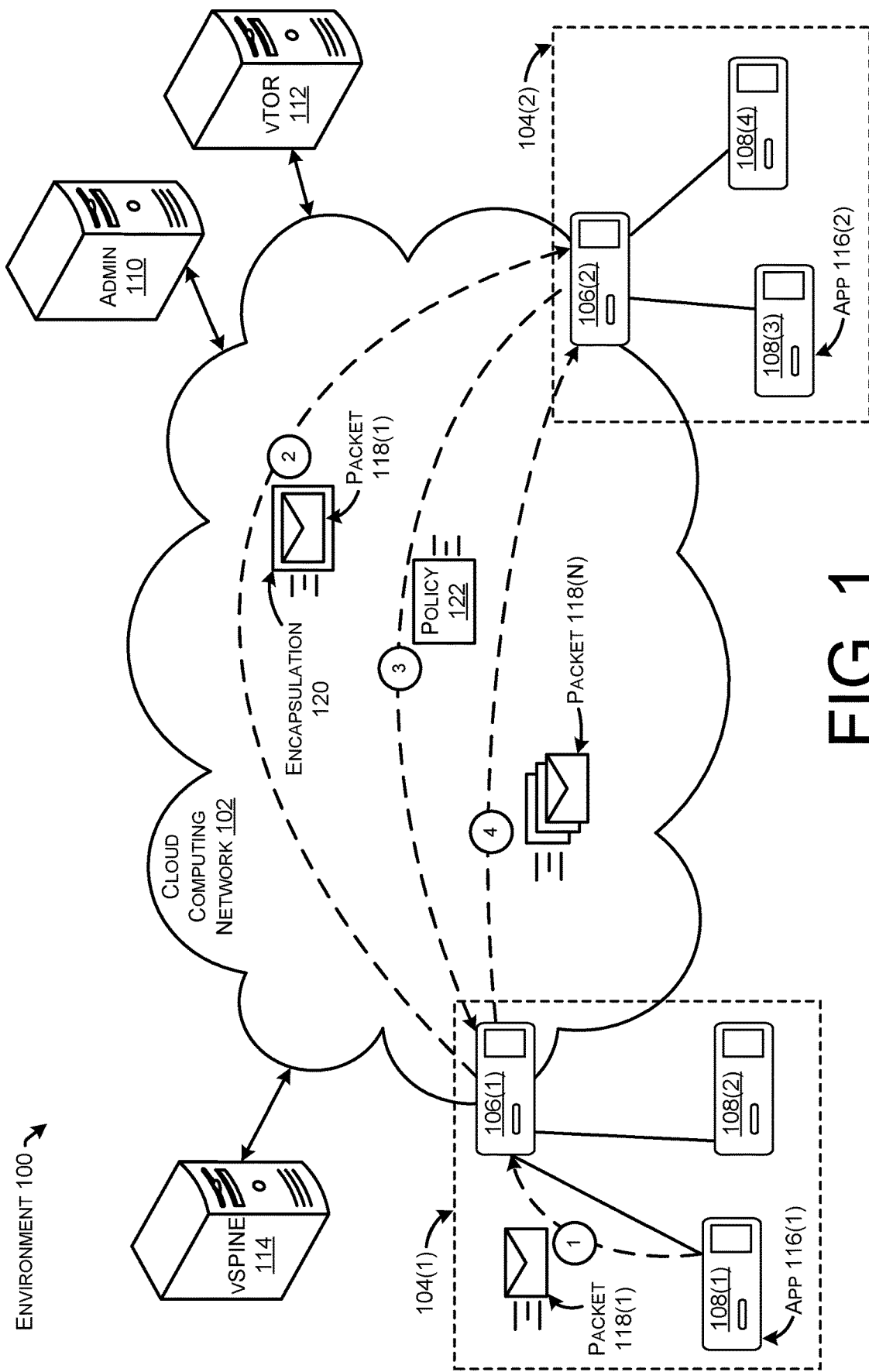
FIG. 1 illustrates a component diagram with an example environment for policy application in a network in accordance with the present concepts.

This disclosure describes a method of applying a policy proximate to a source of data traffic to improve performance of a network. The method includes receiving, at source edge node and from a source device, a packet intended for a destination device associated with a destination edge node. The method can also include determining that a policy related to the packet is incomplete on the source edge node, and encapsulating the packet with an encapsulation that includes an indication that the policy is incomplete on the source edge node. Also, the method may include sending the encapsulated packet to the destination edge node and in response to sending the encapsulated packet, receiving the policy related to the packet from the destination edge node. Furthermore, the method may include programming the policy on the source edge node and applying the policy to a subsequent packet.

Additionally, the techniques described herein may be performed by a system and/or device having non-transitory computer-readable media storing computer-executable instructions that, when executed by one or more processors, performs the method described above.

Example Embodiments

This disclosure describes techniques for applying a policy proximate to a source device of data traffic in a network. For example, the source device may be associated with a source node (e.g., switch) of the network. The data traffic may be intended for a destination device. The destination device may be behind a destination node of the network. In this example, the policy may be applied to the data traffic at the source node, rather than at the destination node. In this manner, the policy may be applied proximate to the source device.

However, the source node may initially be unable to apply the policy regarding the data transfer. For instance, the source node may not have the policy, and/or may not have sufficient information to be able to apply the policy. Application of a policy may require knowledge of relevant information about the destination device and/or the source device. If the relevant information is unknown, a node attempting to apply a policy may not know which policy is appropriate for the data traffic. The information about the destination device and/or the source device may include an address (e.g., internet protocol (IP) address) and/or an identifier (e.g., S-class) of the device.

Due to the fluid nature of virtualized networks, it may be advantageous to avoid unnecessary download of policies at any given node. Downloading irrelevant policies may excessively consume network resources such as bandwidth, and may excessively consume storage space at the node. For this reason, policies may not be "pushed" to a source node prior to an initiation of data traffic. Therefore, techniques for efficiently downloading policies when needed for a transfer of data are desired.

In general, data traffic between a source device and a destination device may be unidirectional or bidirectional. For example, in bidirectional data traffic, the source device may send packets to the destination device and may also receive other packets from the destination device. In unidirectional data traffic, the source device may send packets to the destination device, but there may be no reciprocal data flow from the destination device back to the source device.

Bidirectional data traffic may present an opportunity for the source node to learn information about the destination device. For instance, information about the destination device may be included with a packet sent from the destination device to the source device, passing through the source node. In this instance, the source node may learn the information about the destination device from the packet in the bidirectional data traffic. However, in unidirectional data traffic, since no packets are returning to the source device via the source node, a different mechanism for the source node to learn potentially relevant information about the destination device may be needed.

In some examples, upon initiation of data traffic from the source device, the source node may indicate to the destination node that a policy regarding the data traffic has not been applied. For instance, the source node may encapsulate a packet sent from the source device to the destination device with the indication that the policy has not been applied. In response, the destination device may provide the policy to the source node. In this manner, the source node may be able to apply the policy to a subsequent packet in a flow of unidirectional data traffic. Other methods of remedying policy application in unidirectional data traffic scenarios are contemplated. For instance, rather than directly sending the policy, the destination node and/or another device may supply relevant information about the destination device to the source node, so that the source node may learn which policy to apply to the unidirectional data traffic.

To summarize, network resources may be conserved where a policy is applied proximate to a source device for data traffic, such as at a source node associated with the source device. However, the source node may not have knowledge of a relevant policy for a destination device for the data traffic. In the case of unidirectional data traffic, the source node may indicate to a destination node associated with the destination device that the policy has not been applied. The destination device may then send the policy to the source device for application to a subsequent packet of the unidirectional data traffic. Thus, the policy may be applied closer to the source device, reducing the chance of a dropped packet at the destination node. In this manner, the techniques described herein may significantly reduce consumption of valuable network resources and/or improve the overall performance of the network.

Although the examples described herein may refer to a source node as the point of application of a policy, the techniques can generally be applied to any node in a network. Further, the techniques are generally applicable for any network of devices managed by any entity where virtual resources are provisioned. In some instances, the techniques may be performed by software-defined networking (SDN), and in other examples, various devices may be used in a system to perform the techniques described herein. The devices by which the techniques are performed herein are a matter of implementation, and the techniques described are not limited to any specific architecture or implementation.

The techniques described herein provide various improvements and efficiencies with respect to applying policies across a network. For instance, the techniques described herein may reduce the amount of storage, dropped data, latency, and other issues experienced in networks due to lack of network resources, improper policy application, and/or improper routing of data. By improving the application of policies across a network, the network communications performed by servers and virtual resources may be improved.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example environment 100 in accordance with the present policy application concepts. Example environment 100 may include cloud computing network 102 and hosts 104. Hosts 104, indicated generally by dashed boxes, may include edge nodes 106 (e.g., network access devices) and endpoint groups (EPGs) 108. Example environment 100 may also include an administrator 110, a virtual top-of-rack switch (vTOR) 112, and/or a virtual spine (vSPINE) 114.

In some examples, hosts 104 may be servers capable of creating virtual machines (VMs) on the hosts. For instance, host 104(1) (e.g., ESX host) may have a hypervisor (e.g., ESX/ESXi hypervisor) capable of creating VMs. In the example shown in FIG. 1, edge nodes 106 and/or EPGs 108 may be VMs created by the hosts 104. The edge nodes 106 may be virtual switches, such as application virtual edges (AVEs), created by the hosts 104. Stated another way, edge node 106(1) may be a VM that acts as a forwarder of data traffic for host 104(1). Edge node 106(1) may be a forwarder of potentially all traffic on host 104(1), including traffic between VMs within host 104(1).

In some examples, the cloud computing network 102 may be utilized to transfer data between cloud computing resources. EPGs 108 may be utilized as cloud computing resources. For example, edge node 106(1) may be communicatively coupled to EPGs 108(1) and 108(2). Similarly, edge node 106(2) may be communicatively coupled to EPGs 108(3) and 108(4). Only two EPGs 108 are shown coupled to each edge node 106 in FIG. 1 to avoid clutter on the drawing page; the number of EPGs 108 is not meant to be limiting. Also, EPGs 108 may have applications 116, such as application 116(1) of EPG 108(1) and application 116(2) of EPG 108(3).

FIG. 1 also includes an example unidirectional data traffic scenario indicated by numbered, dashed arrows. In some instances, application 116(1) may intend to transfer data across cloud computing network 102 to application 116(2). As indicated at Arrow 1, application 116(1) may initiate data traffic by sending packet 118(1) from EPG 108(1) to edge node 106(1). Upon receipt of packet 118(1), edge node 106(1) may determine that edge node 106(2) is a next hop for the packet 118(1). For instance, edge node 106(1) may perform a forwarding lookup to determine a destination node and/or destination device for packet 118(1). Edge node 106(1) may communicate with vSPINE 114 to perform the forwarding lookup. In some examples, vSPINE 114 may serve as a database repository for EPG information. The edge nodes 106 may publish information about the EPGs 108 to vSPINE 114, for example. Other methods for edge node 106(1) to receive a forwarding address are contemplated.

In this case, EPG 108(1) may be considered a source device and edge node 106(1) may be considered a source edge node (e.g., ingress node). Similarly, edge node 106(2) may be considered a destination edge node (e.g., egress node) and EPG 108(3) may be considered a destination device. In general, any number of source devices and/or destination devices may be associated with any host (e.g., host device) and/or edge node, and/or the number may vary over time as the virtualized network structure changes.

As introduced above, a transfer of data between applications may be governed by a policy. In some examples, the policy may be set by a user via administrator 110. Administrator 110 may be controller that provides automation and/or management for software-defined networking (SDN) components (e.g., fabric), including optimization, configuration, policy enforcement, health monitoring, etc. For example, administrator may be an application policy infrastructure controller (e.g., Cisco APIC). The policy set by the user via the administrator 110 may be part of a contract written by the user allowing applications to communicate. For instance, the user may write a contract where application 116(1) is a web application (e.g., consumer) that communicates with application 116(2), which is a database application (e.g., provider). In this instance, EPGs 108 may be considered application containers. Administrator 110 may provide the policy to vTOR 112. In some implementations, vTOR 112 may relay the policy and/or other configuration information from administrator 110 to an appropriate edge node 106. The vTOR 112 may distribute any particular policy based on an EPG 108 behind an edge node 106, for instance. In some examples, vTOR 112 may not participate in data plane forwarding, unlike a physical TOR.

However, even though an edge node 106 may receive a policy, the edge node 106 may not be able to apply (e.g., enforce) the policy, and/or know whether the policy is relevant to any given data traffic. For example, vTOR 112 may send a policy to edge node 106(1) and/or edge node 106(2). Thus, edge node 106(1) may learn that EPG 108(1) has a contract, but edge node 106(1) may be unable to program the policy (and therefore apply the policy) since edge node 106(1) may not know information regarding a potential destination device. Similarly, edge node 106(2) may be unable to program the policy (and therefore apply the policy) without first learning information regarding a source device. In this way, the policy may be considered incomplete on the edge nodes 106.

In the example unidirectional data traffic scenario illustrated in FIG. 1, at Arrow 1, packet 118(1) may be unable to apply a policy to edge node 106(1). For instance, as suggested above, even though edge node 106(1) may learn that edge node 106(2) is a next hop for packet 118(1), and/or learn the IP address of EPG 108(3), edge node 106(1) may still lack information regarding applying a policy to packet 118(1). Edge node 106(1) may need additional information about the destination device, EPG 108(3), in order to apply a relevant policy. The additional information needed to apply a policy for any given device may include a variety of data or metadata, such as more detailed address or endpoint address information, identifier, S-class, web service definition language (WSDL) elements, and/or other information that may be included in an address header. Hereinafter, such additional information beyond a device IP address will be referred to as an "identifier" of the device. (Since EPG 108(1) is associated with edge node 106(1), edge node 106(1) may already know the identifier for EPG 108(1).)

Continuing with Arrow 2 in FIG. 1, edge node 106(1) may proceed with sending packet 118(1) to edge node 106(2), without having applied a policy edge node 106(1). Also, edge node 106(1) may indicate to edge node 106(2) that a policy regarding the data traffic has not been applied. For instance, edge node 106(1) may encapsulate packet 118(1) in encapsulation 120 (e.g., a header). Encapsulation may include bits that may be set indicating "source policy incomplete" and/or "destination policy incomplete," for instance. Encapsulation 120 may also include other pertinent information, such as an IP address (e.g., tunnel endpoint (TEP) IP) for edge node 106(1) and an IP address and/or an identifier (e.g., S-class) for EPG 108(1). A variety of protocols are contemplated for packet 118(1) and/or the unidirectional data traffic, such as iVXLAN, Geneve, and VXLAN-GPE. For instance, Geneve offers a variable length options field, which may be used to carry the encapsulation information such as the source node IP address, the identifier of the source device, and also whether the policy was applied. Also, VXLAN-GPE offers a Network Service Header (NSH), which can be used to carry metadata including the encapsulation information.

Edge node 106(2) may determine from encapsulation 120 that a policy has not been applied to the packet 118(1). Edge node 106(2) may also determine from encapsulation 120 that a particular policy, policy 122 in this case, is relevant to the packet 118(1) and/or to data traffic between EPG 108(1) and EPG 108(3). For instance, edge node 106(2) may learn the identifier of EPG 108(1) (e.g., source device) from the encapsulation 120 and may know the identifier of EPG 108(3) (e.g., destination device) with which it is associated, and therefore determine that policy 122 is relevant. Alternatively or additionally, edge node 106(2) may use information from encapsulation 120, such as the identifier for EPG 108(1), to formulate a request to vTOR 112 to download the relevant policy. Once policy 122 is known and/or downloaded, edge node 106(2) may then apply policy 122 to packet 118(1), and forward packet 118(1) to EPG 108(3) (assuming the rules embodied in policy 122 allow packet 118(1) to be forwarded).

Continuing with Arrow 3 in FIG. 1, edge node 106(2) may then provide policy 122 to edge node 106(1). Since the IP address of edge node 106(1) may have been included in encapsulation 120, edge node 106(2) may be able to learn where to send policy 122 without a further lookup step. For instance, edge node 106(2) may be able to use the IP address of edge node 106(1) to set up or establish a transmission control protocol (TCP) connection with edge node 106(1) for transferring policy 122. The edge nodes 106 may have a port set up for receiving the policy 122 via the TCP connection. In some examples, the TCP connection established by the edge nodes 106 may be taken down after transfer of the policy 122. Note that the TCP connection need not rely on any control plane element of environment 100. In some examples, rather than sending the actual policy 122, edge node 106(2) may provide edge node 106(1) with pertinent information so that edge node 106(1) may learn which policy 122 applies to the data traffic. In this manner, edge node 106(2) may be viewed as enabling edge node 106(1) to apply a relevant policy proximate to a source device. For instance, sending the policy may be viewed as sending the identifier for the destination device, EPG 108(3), from edge node 106(2) to edge node 106(1) so that edge node 106(1) may apply policy 122 to a subsequent packet 118.

Continuing with Arrow 4 in FIG. 1, edge node 106(1) may then apply policy 122 to a subsequent packet(s) 118(N) in the unidirectional data traffic sent from edge node 106(1) to edge node 106(2). Here "N" may represent any number of subsequent packets 118. As such, going forward in the scenario, the policy is applied proximate to the source device, EPG 108(1), greatly helping to conserve bandwidth in the cloud computing network.

In some examples, the above-described method may apply to scenarios where a policy is applied closer to a data traffic source, but not necessarily at a source edge node. For instance, policy application techniques may be used to apply a policy at any node that is closer to a source than to a destination of data traffic, thereby conserving network resources. In some examples, policy application techniques may be viewed as applying a policy at a proximate node relative to a proximate device (e.g., source device), where data traffic is sent from the proximate device to a distant device (e.g., destination device) via a distant node in a network.

Additionally or alternatively, policies may be modified or deleted. In some implementations, an edge node may keep track of which policy or policies have been provided to another edge node. In an instance where a policy is modified, the edge node may send the updated policy to the other edge node, and/or indicate that the old policy may be deleted. In an instance where a policy is deleted, the edge node may communicate that the old policy may be deleted. Other techniques for efficiently managing and/or updating policies are contemplated.

In the example scenario illustrated in FIG. 1, the information available in the encapsulation 120 of packet 118(1) was used to make an intelligent decision to send policy 122 to edge node 106(1) so that the policy could be efficiently applied near the source of the data traffic. Providing a policy from a destination edge node to a source edge node may also be useful in other scenarios, even bidirectional data traffic scenarios, where the source edge has not received a relevant policy for a current data transfer. In some examples, policy is a critical piece of software-defined access solutions, and application of policy as close to the source of data traffic as possible is essential to efficient deployment of network resources. In cloud deployments, application of a policy close to the source may be even more critical.

Figure 2:
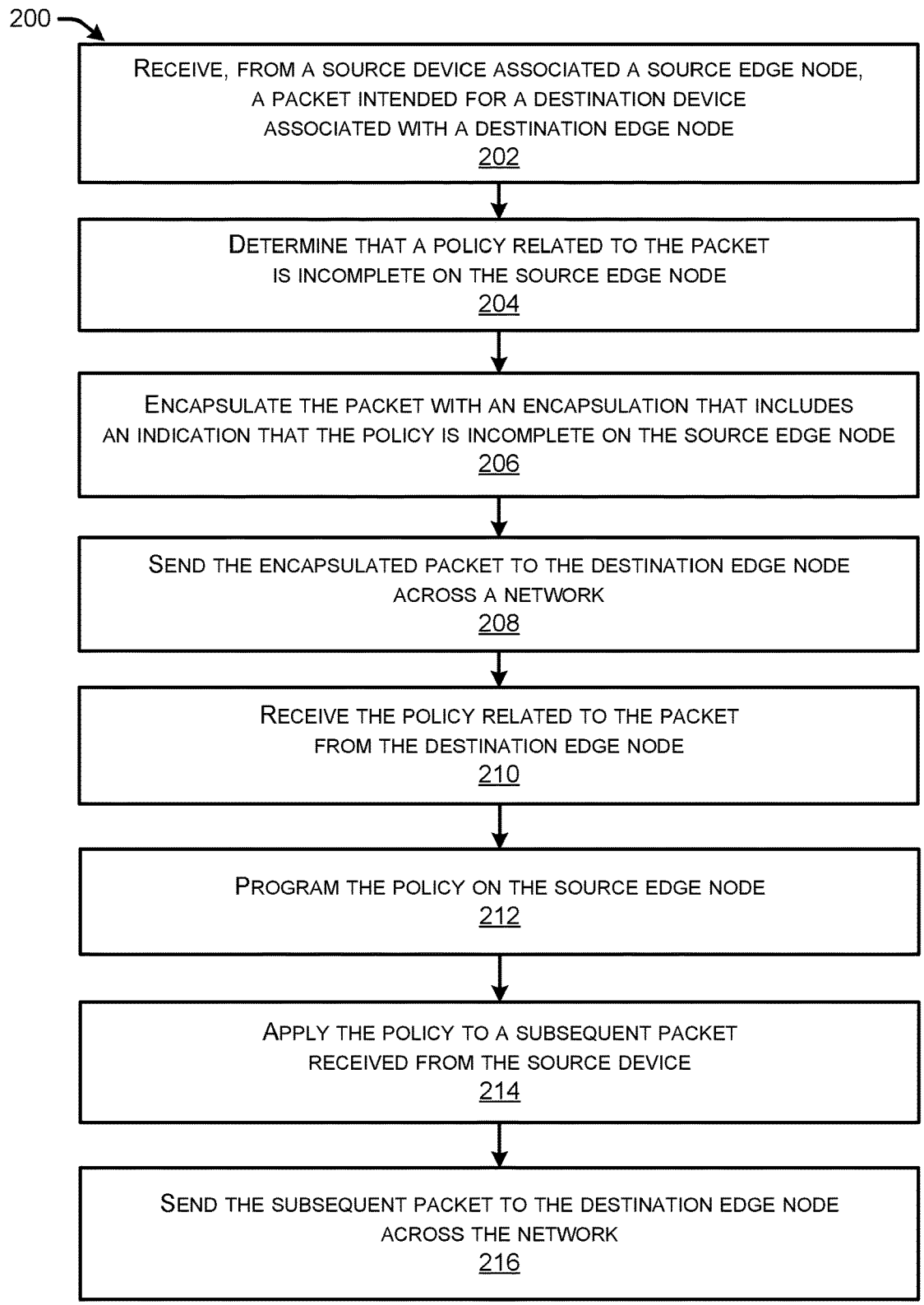
FIGS. 2 and 3 illustrate flow diagrams of example methods for devices of a cloud computing network to apply policies in accordance with the present concepts.
Figure 3:
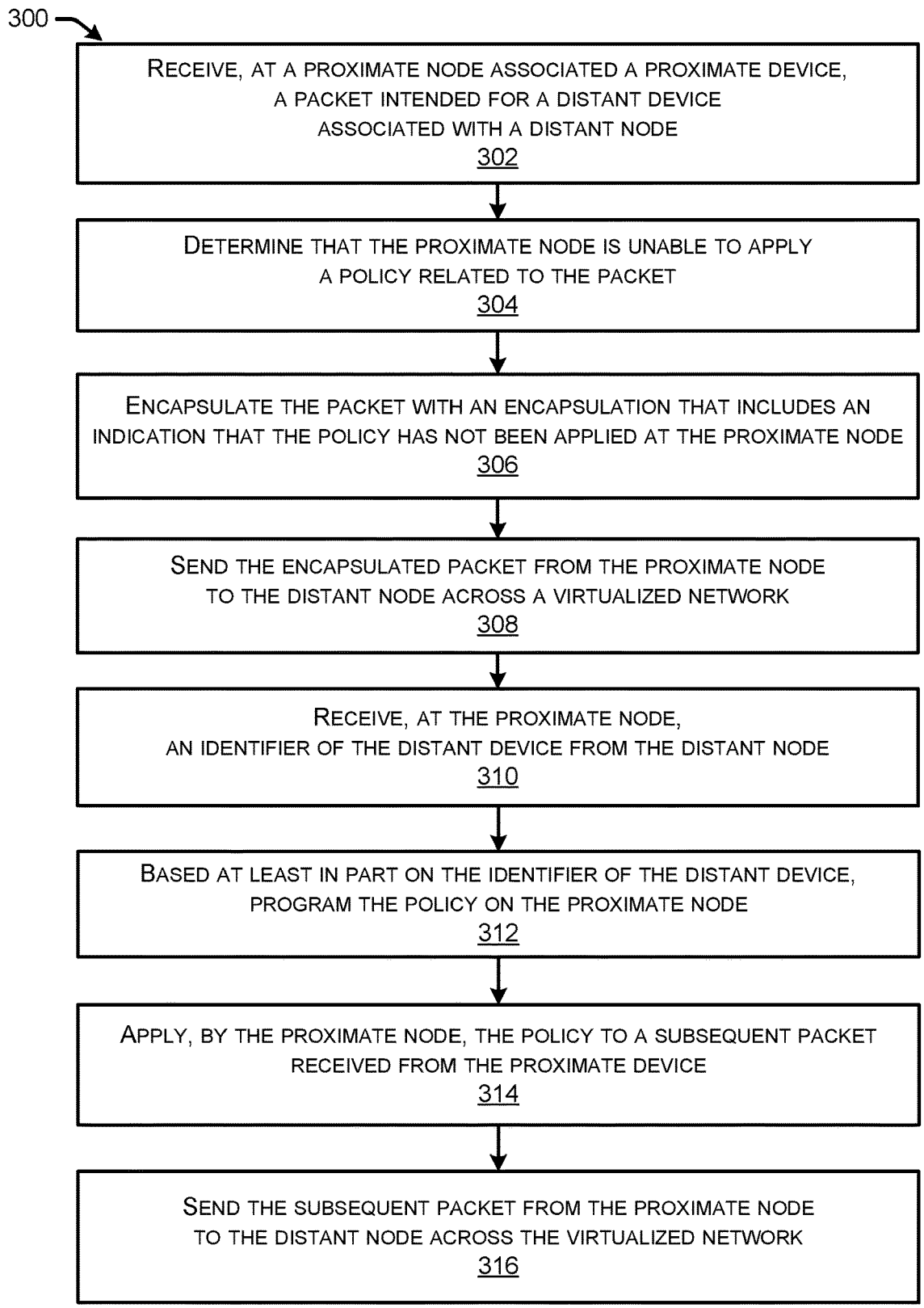

FIGS. 2 and 3 illustrate flow diagrams of example methods 200 and 300 that illustrate aspects of the functions performed at least partly by the cloud computing network 102 as described in FIG. 1. The logical operations described herein with respect to FIGS. 2 and 3 may be implemented (1) as a sequence of computer-implemented acts or program modules running on a computing system and/or (2) as interconnected machine logic circuits or circuit modules within the computing system.

The implementation of the various devices and/or components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 2 and 3 and described herein. These operations can also be performed in parallel, or in a different order than those described herein. Some or all of these operations can also be performed by components other than those specifically identified. Although the techniques described in this disclosure is with reference to specific devices, in other examples, the techniques may be implemented by less devices, more devices, different devices, or any configuration of devices and/or components.

FIG. 2 illustrates a flow diagram of an example method 200 for devices of network to perform policy application proximate to a source of data traffic. In some examples, method 200 may be performed by a computing device comprising one or more processors and one or more non-transitory computer-readable media storing computer-executable instructions that, when executed by the one or more processors, cause the one or more processors to perform method 200.

At 202, a source edge node (e.g., edge node 106(1) in FIG. 1) may receive, from a source device associated with the source edge node, a packet intended for a destination device associated with a destination edge node. The packet may relate to initiation of data traffic from the source device to the destination device.

At 204, the source edge node may determine that a policy related to the packet is incomplete on the source edge node. For instance, the policy may not be programmed at the source edge node, and/or the source edge node may have incomplete information regarding application of the policy.

At 206, the source edge node may encapsulate the packet with an encapsulation that includes an indication that the policy is incomplete on the source edge node. The indication that the policy is incomplete may be a bit setting in the encapsulation.

At 208, the source edge node may send the encapsulated packet to the destination edge node across a network. The network may be a virtualized network and/or a cloud computing network. Sending the encapsulated packet may include sending additional information to the destination edge node, such as an address of the source device, an identifier of the source device, and/or an address of the source edge node.

At 210, the source edge node may receive the policy related to the packet from the destination edge node. In some cases, the source edge node may receive the policy in response to sending the encapsulated packet. The policy may be related to a contract between the source device and the destination device, such as a contract to communicate. In some examples, the policy and/or contract may include at least one rule and/or filter regarding a transfer of data from the source device to the destination device. Also, method 200 may include establishing a connection between the source edge node and the destination edge node for receiving the policy. The connection may be requested and/or established by the source edge node and/or the destination edge node. The policy may then be received from the destination edge node via the established connection.

At 212, the source edge node may program the policy on the source edge node. Programming the policy on the source edge node may include downloading the policy, storing, the policy, and/or installing the policy at the source edge node, for instance.

At 214, the source edge node may apply the policy to a subsequent packet received from the source device. The source edge node may apply the policy upon determining that the subsequent packet is related to the encapsulated packet. The encapsulated packet and the subsequent packet may be part of a unidirectional data traffic flow, for example.

At 216, the source edge node may send the subsequent packet to the destination edge node across the network. Method 200 may further include sending any number of additional subsequent packets. In some examples, the subsequent packet(s) may also be encapsulated.

FIG. 3 illustrates a flow diagram of an example method 300 for devices of a network to perform policy application proximate to a source of data traffic. In some examples, method 300 may be performed by a computing device comprising one or more processors and one or more non-transitory computer-readable media storing computer-executable instructions that, when executed by the one or more processors, cause the one or more processors to perform method 300.

At 302, method 300 may include receiving, at a proximate node from a proximate device associated with the proximate node, a packet intended for a distant device associated with a distant node. In some examples, the proximate node and/or the distant node may function as ingress and/or egress nodes for a virtualized network. The use of "proximate" or "distant" is not meant to represent a particular distance or physical separation. Rather, the proximate node may simply be closer to the proximate device than the distant node, for example.

At 304, method 300 may include determining that the proximate node is unable to apply a policy related to the packet. The proximate node may be unable to apply the policy because the proximate node does not have the policy. Alternatively or additionally, the proximate node may be unable to apply the policy because the proximate node has incomplete information regarding application of the policy. For instance, the proximate node may have incomplete information regarding the distant device.

At 306, method 300 may include encapsulating the packet with an encapsulation that includes an indication that the policy has not been applied at the proximate node. Other methods of indicating to the distant node that the policy has not been applied are considered. For example, the proximate node may send a communication to the distant node separate from the encapsulated packet. In this case, the communication to the distant node may indicate that the proximate node does not have the policy, and/or has incomplete information regarding the policy.

At 308, method 300 may include sending the encapsulated packet from the proximate node to the distant node across the virtualized network.

At 310, method 300 may include receiving, at the proximate node, an identifier of the distant device from the distant node. Alternatively or additionally, the policy may be received at the proximate node. The policy may be received from the distant node, of from another entity associated with the virtualized network, such as a virtualized top-of-rack switch (vTOR) of the virtual network. The identifier and/or the policy may be received at the proximate node in response to sending the encapsulated packet to the distant node.

At 312, method 300 may include programming the policy on the proximate node. The programming may be based at least in part on the identifier of the distant device. For instance, upon learning the identifier of the distant device, the proximate node may be able to program the policy at the proximate node, and therefore apply the policy.

At 314, method 300 may include applying, by the proximate node, the policy to a subsequent packet received from the proximate device. The subsequent packet may be part of the same data traffic as the packet that was encapsulated.

At 316, method 300 may include sending the subsequent packet from the proximate node to the distant node across the virtualized network.

Figure 4:
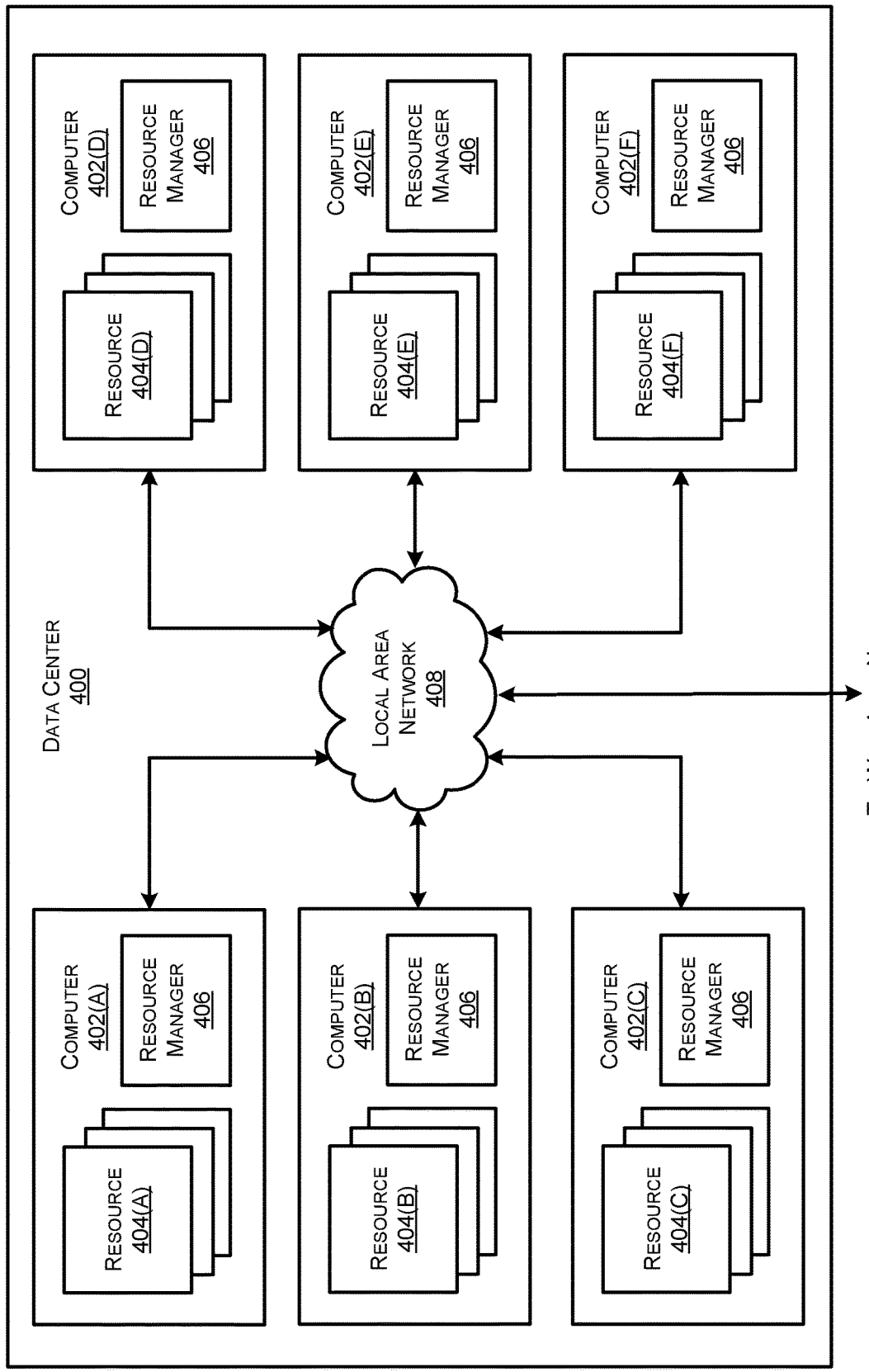
FIG. 4 illustrates a computing system diagram illustrating a configuration for a data center that can be utilized to implement aspects of the technologies disclosed herein.

FIG. 4 is a computing system diagram illustrating a configuration for a data center 400 that can be utilized to implement aspects of the technologies disclosed herein. The example data center 400 shown in FIG. 4 includes several computers 402A-402F (which might be referred to herein singularly as "a computer 402" or in the plural as "the computers 402") for providing computing resources. In some examples, the resources and/or computers 402 may include, or correspond to, any type of networked device described herein, such as one or more of hosts 104, edge nodes 106, EPGs 108, administrator 110, vTOR 112, and/or vSPINE 114 (FIG. 1). Although computers 402 may comprise any type of networked device, such as servers, switches, routers, hubs, bridges, gateways, modems, repeaters, access points, hosts, etc.

The computers 402 can be standard tower, rack-mount, or blade server computers configured appropriately for providing computing resources. In some examples, the computers 402 may provide computing resources 404 including data processing resources such as virtual machine (VM) instances or hardware computing systems, database clusters, computing clusters, storage clusters, data storage resources, database resources, networking resources, and others. Some of the computers 402 can also be configured to execute a resource manager 406 capable of instantiating and/or managing the computing resources. In the case of VM instances, for example, the resource manager 406 can be a hypervisor or another type of program configured to enable the execution of multiple VM instances on a single computer 402. Computers 402 in the data center 400 can also be configured to provide network services and other types of services.

In the example data center 400 shown in FIG. 4, an appropriate local area network (LAN) 408 is also utilized to interconnect the computers 402A-402F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 400, between each of the computers 402A-402F in each data center 400, and, potentially, between computing resources in each of the computers 402. It should be appreciated that the configuration of the data center 400 described with reference to FIG. 4 is merely illustrative and that other implementations can be utilized.

In some examples, the computers 402 may each execute one or more application containers and/or virtual machines to perform techniques described herein. For instance, the containers and/or virtual machines may serve as endpoints, EPGs, and/or nodes in the cloud computing network 102, such as edge nodes 106 and/or EPGs 108.

In some instances, the data center 400 may provide computing resources, like application containers, VM instances, and storage, on a permanent or an as-needed basis. Among other types of functionality, the computing resources provided by a cloud computing network may be utilized to implement the various services and techniques described above. The computing resources 404 provided by the cloud computing network can include various types of computing resources, such as data processing resources like application containers and VM instances, data storage resources, networking resources, data communication resources, network services, and the like.

Each type of computing resource 404 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 404 not mentioned specifically herein.

The computing resources 404 provided by a cloud computing network may be enabled in one embodiment by one or more data centers 400 (which might be referred to herein singularly as "a data center 400" or in the plural as "the data centers 400"). The data centers 400 are facilities utilized to house and operate computer systems and associated components. The data centers 400 typically include redundant and backup power, communications, cooling, and security systems. The data centers 400 can also be located in geographically disparate locations. One illustrative embodiment for a data center 400 that can be utilized to implement the technologies disclosed herein will be described below with regard to FIG. 5.

Figure 5:
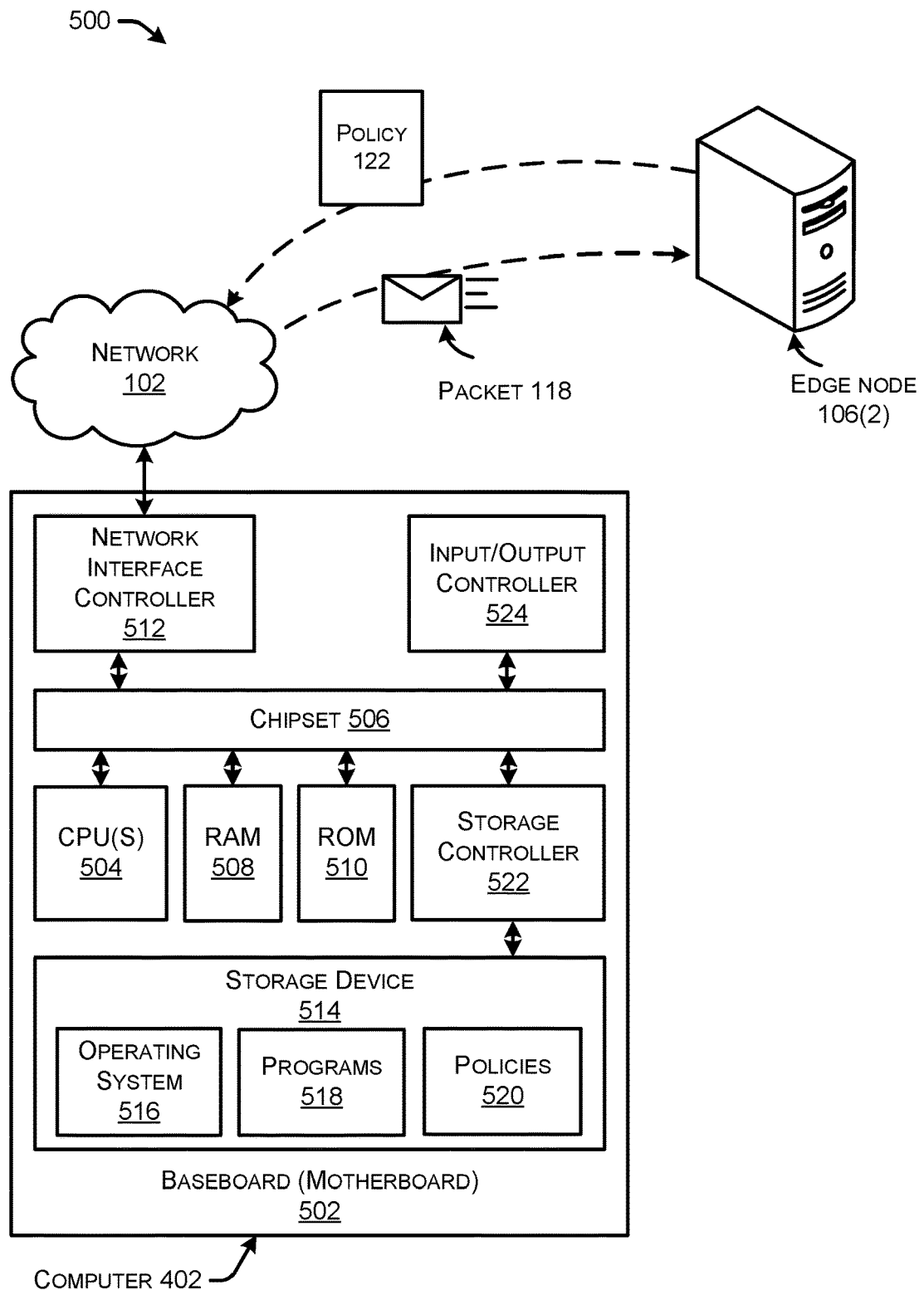
FIG. 5 is a computer architecture diagram showing an illustrative computer hardware architecture for implementing a computing device that can be utilized to implement aspects of the various technologies presented herein.

FIG. 5 shows an example computer architecture 500 for a computer 402 capable of executing program components for implementing the functionality described above. The computer architecture 500 shown in FIG. 5 illustrates a conventional server computer, workstation, desktop computer, laptop, tablet, network appliance, e-reader, smartphone, and/or other computing device, and can be utilized to execute any of the software components presented herein. The computer 402 may, in some examples, correspond to a physical device described herein (e.g., hosts, endpoints, endpoint groups, edge nodes, administrator, etc.), and may comprise networked devices such as servers, switches, routers, hubs, bridges, gateways, modems, repeaters, access points, etc. For instance, computer 402 may correspond to edge node 106(1).

As shown in FIG. 5, the computer 402 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 402.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 402. The chipset 506 can further provide an interface to a computer-readable storage medium such as a read-only memory ("ROM") 510 or non-volatile RAM ("NVRAM") for storing basic routines that help to startup the computer 402 and to transfer information between the various components and devices. The ROM 510 or NVRAM can also store other software components necessary for the operation of the computer 402 in accordance with the configurations described herein.

The computer 402 can operate in a networked environment using logical connections to remote computing devices and computer systems through a network, such as the network 102 (and/or 408). The chipset 506 can include functionality for providing network connectivity through a network interface controller (NIC) 512, such as a gigabit Ethernet adapter. The NIC 512 is capable of connecting the computer 402 to other computing devices over the network 102 (and/or 408). For instance, in the example shown in FIG. 5, NIC 512 may help facilitate transfer of packet(s) 118 over the network 102 with edge node 106(2). NIC 512 may also help receive packet(s) 118 over a local area network (e.g., network 408) from a source device (e.g., EPG 108(1) in FIG. 1). As shown in FIG. 5, NIC 512 may also help facilitate download of a policy (e.g., policy 122) and/or multiple policies from edge node 106(2). It should be appreciated that multiple NICs 512 can be present in the computer 402, connecting the computer to other types of networks and remote computer systems.

The computer 402 can be connected to a storage device 514 that provides non-volatile storage for the computer. The storage device 514 can store an operating system 516, programs 518, policies 520, and/or other data, such as information related to policies (e.g., address and/or identifiers of devices), which have been described in greater detail herein. The storage device 514 can be connected to the computer 402 through a storage controller 522 connected to the chipset 506, for example. The storage device 514 can consist of one or more physical storage units. The storage controller 522 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 402 can store data on the storage device 514 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 514 is characterized as primary or secondary storage, and the like.

For example, the computer 402 can store information to the storage device 514 by issuing instructions through the storage controller 522 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 402 can further read information from the storage device 514 by detecting the physical states or characteristics of one or more particular locations within the physical storage units.

In addition to the mass storage device 514 described above, the computer 402 can have access to other computer-readable storage media to store and retrieve information, such as policies, program modules, data structures, and/or other data. It should be appreciated by those skilled in the art that computer-readable storage media is any available media that provides for the non-transitory storage of data and that can be accessed by the computer 402. In some examples, the operations performed by the network 102, and or any components included therein, may be supported by one or more devices similar to computer 402. Stated otherwise, some or all of the operations performed by the network 102, and or any components included therein, may be performed by one or more computer devices 402 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, ternary content addressable memory (TCAM), and/or other optical storage, magnetic cassettes, magnetic tape, magnetic disk storage or other magnetic storage devices, or any other medium that can be used to store the desired information in a non-transitory fashion.

As mentioned briefly above, the storage device 514 can store an operating system 516 utilized to control the operation of the computer 402. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 514 can store other system or application programs and data utilized by the computer 402.

In one embodiment, the storage device 514 or other computer-readable storage media is encoded with computer-executable instructions which, when loaded into the computer 402, transform the computer from a general-purpose computing system into a special-purpose computer capable of implementing the embodiments described herein. These computer-executable instructions transform the computer 402 by specifying how the CPUs 504 transition between states, as described above. According to one embodiment, the computer 402 has access to computer-readable storage media storing computer-executable instructions which, when executed by the computer 402, perform the various processes described above with regard to FIGS. 1A-4. The computer 402 can also include computer-readable storage media having instructions stored thereupon for performing any of the other computer-implemented operations described herein.

The computer 402 can also include one or more input/output controllers 524 for receiving and processing input from a number of input devices, such as a keyboard, a mouse, a touchpad, a touch screen, an electronic stylus, or other type of input device. Similarly, an input/output controller 524 can provide output to a display, such as a computer monitor, a flat-panel display, a digital projector, a printer, or other type of output device. It will be appreciated that the computer 402 might not include all of the components shown in FIG. 5, can include other components that are not explicitly shown in FIG. 5, or might utilize an architecture completely different than that shown in FIG. 5.

As described herein, the computer 402 may comprise one or more devices, such as edge nodes 106, EPGs 108, administrator 110, vTOR 112, vSPINE 114, and/or other devices. The computer 402 may include one or more hardware processors 504 (processors) configured to execute one or more stored instructions. The processor(s) 504 may comprise one or more cores. Further, the computer 402 may include one or more network interfaces configured to provide communications between the computer 402 and other devices, such as the communications described herein as being performed by edge nodes 106, EPGs 108, administrator 110, vTOR 112, vSPINE 114, and/or other devices. In some examples, the communications may include packet, data traffic, policy, request, and/or other information transfer, for instance. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 518 may comprise any type of programs or processes to perform the techniques described in this disclosure in accordance with conversation-based policy distribution techniques. For instance, the programs 518 may cause the computer 402 to perform techniques for communicating with other devices using any type of protocol or standard usable for determining connectivity. Additionally, the programs 518 may comprise instructions that cause the computer 402 to perform the specific techniques for policy application, such as applying, installing, and/or programming policies, encapsulating packets, establishing communications with other nodes, and/or transferring data.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method performed by a source edge node, the method comprising:
    initiating a unidirectional data traffic flow from the source edge node to a destination edge node, the initiating the unidirectional data traffic flow comprising:
        receiving, from a source device associated with the source edge node, a first packet of the unidirectional data traffic flow intended for a destination device associated with the destination edge node,
        receiving a destination edge node address of the destination edge node,
        determining that a policy related to the unidirectional data traffic flow is incomplete on the source edge node,
        encapsulating the first packet of the unidirectional data traffic flow with an encapsulation that includes an indication that the policy is incomplete on the source edge node, and sending the encapsulated first packet of the unidirectional data traffic flow across a network to the destination edge node at the destination edge node address;
in response to sending the encapsulated first packet of the unidirectional data traffic flow to the destination edge node, receiving, from the destination edge node, the policy related to the unidirectional data traffic flow;
programming the policy on the source edge node;
applying the policy to a subsequent packet of the unidirectional data traffic flow; and
sending the subsequent packet of the unidirectional data traffic flow to the destination edge node across the network.

2. The method of claim 1, wherein determining that the policy is incomplete further comprises determining that an identifier of the destination device is incomplete at the source edge node.

3. The method of claim 1, wherein the policy includes at least one rule regarding the unidirectional data traffic flow from the source device to the destination device.

4. The method of claim 1, further comprising:
sending a source device address of the source device, a source device identifier of the source device, and a source edge node address of the source edge node with the encapsulated first packet to the destination edge node.

5. The method of claim 1, wherein the network is a cloud computing network.

6. The method of claim 1, further comprising:
setting a value of at least one bit in the encapsulation, wherein the value is the indication that the policy is incomplete.

7. The method of claim 1, further comprising:
establishing a connection with the destination edge node for receiving the policy; and
receiving the policy from the destination edge node via the established connection.

8. The method of claim 1, further comprising:
receiving an identifier of the destination device with the policy from the destination edge node; and
using the identifier to apply the policy to the subsequent packet.

9. A computing device comprising:
one or more processors; and
one or more non-transitory computer-readable media storing computer-executable instructions that, when executed by the one or more processors, cause the one or more processors to:
initiate a data traffic flow from the computing device to an edge node, initiating the data traffic flow comprising:
receiving, from a source device associated with the computing device, a first packet of the data traffic flow intended for a destination device associated with the edge node,
receiving an edge node address of the edge node,
determining that a policy related to the data traffic flow is incomplete on the computing device,
encapsulating the first packet of the data traffic flow with an encapsulation that includes an indication that the policy is incomplete on the computing device, and
sending the encapsulated first packet of the data traffic flow across a network to the edge node at the edge node address;
in response to sending the encapsulated first packet of the data traffic flow to the edge node, receiving, from the edge node, the policy related to the data traffic flow;
programming the policy on the computing device;
applying the policy to a subsequent packet of the data traffic flow; and
sending the subsequent packet of the data traffic flow to the edge node across the network.

10. The computing device of claim 9, wherein the data traffic flow that includes the first packet and the subsequent packet comprises a unidirectional data traffic flow from the source device to the destination device and wherein the policy includes at least one rule regarding the unidirectional data traffic flow.

11. The computing device of claim 10, wherein determining that the policy is incomplete further comprises determining that an identifier of the destination device is incomplete at the computing device.

12. The computing device of claim 9, wherein the computer-executable instructions further cause the one or more processors to:
send a source device address of the source device, a source device identifier of the source device, and a computing device address of the computing device with the encapsulated first packet to the edge node.

13. The computing device of claim 9, wherein the network is a cloud computing network.

14. The computing device of claim 9, wherein the computer-executable instructions further cause the one or more processors to:
set a value of at least one bit in the encapsulation, wherein the value is the indication that the policy is incomplete.

15. The computing device of claim 9, wherein the computer-executable instructions further cause the one or more processors to:
establish a connection with the edge node for receiving the policy; and
receive the policy from the edge node via the established connection.

16. The computing device of claim 9, wherein the computer-executable instructions further cause the one or more processors to:
receive an identifier of the destination device with the policy from the edge node; and
use the identifier to apply the policy to the subsequent packet.

17. A method comprising:
receiving, at a proximate node from a proximate device associated with the proximate node, an initial packet of a data traffic flow intended for a distant device associated with a distant node;
receiving a distant node address of the distant node;
determining that the proximate node is unable to apply a policy related to the data traffic flow;
encapsulating the initial packet with an encapsulation that includes an indication that the policy has not been applied at the proximate node;
sending the encapsulated initial packet of the data traffic flow from the proximate node to the distant node at the distant node address across a virtualized network;
receiving, at the proximate node, an identifier of the distant device from the distant node;
based at least in part on the identifier of the distant device, programming the policy on the proximate node;
applying, by the proximate node, the policy to a subsequent packet of the data traffic flow received from the proximate device; and sending the subsequent packet of the data traffic flow from the proximate node to the distant node across the virtualized network.

18. The method of claim 17, wherein the proximate node and the distant node are edge nodes of the virtualized network.

19. The method of claim 17, further comprising:
receiving the policy at the proximate node from a virtualized top-of-rack switch (vTOR) of the virtual network.

20. The method of claim 17, further comprising:
sending a proximate device address of the proximate device, a proximate device identifier of the proximate device, and a proximate node address of the proximate node with the encapsulated initial packet to the distant node.

* * * * *